United States Patent [19]

Farnham et al.

[11] Patent Number: 4,839,571
[45] Date of Patent: Jun. 13, 1989

[54] SAFETY BACK-UP FOR METERING PUMP CONTROL

[75] Inventors: Robert E. Farnham, Naperville; Fredric W. Prill, North Aurora, both of Ill.

[73] Assignee: Barber-Greene Company, DeKalb, Ill.

[21] Appl. No.: 26,964

[22] Filed: Mar. 17, 1987

[51] Int. Cl.[4] ............................................... G05B 5/00
[52] U.S. Cl. .................................... 340/606; 318/644; 364/510
[58] Field of Search ........................ 318/333–335, 318/561, 456–458, 461–462, 482, 644; 366/16–17, 19, 44–45; 364/159, 166, 502, 510; 73/195, 198; 415/116–118; 417/44, 63; 340/506–508

[56] References Cited

U.S. PATENT DOCUMENTS

| | | | |
|---|---|---|---|
| 4,089,509 | 5/1978 | Morton et al. | 366/8 |
| 4,129,034 | 12/1978 | Niles et al. | 364/442 |
| 4,256,998 | 3/1981 | Samuels et al. | 318/335 |
| 4,322,167 | 3/1982 | Hill | 366/19 |
| 4,330,828 | 5/1982 | Smith et al. | 318/561 |
| 4,363,742 | 12/1982 | Stone | 366/17 |
| 4,490,044 | 12/1984 | Saito et al. | 366/17 |
| 4,585,353 | 4/1986 | Schönhausen | 366/16 |
| 4,654,802 | 3/1987 | Davis | 366/17 |
| 4,686,439 | 8/1987 | Cunningham et al. | 318/335 |

Primary Examiner—William M. Shoop, Jr.
Assistant Examiner—David Martin
Attorney, Agent, or Firm—Jones, Day, Reavis & Pogue

[57] ABSTRACT

A system to detect partial or complete failure of an accurate meter measuring the flow of a liquid by using a sensor to measure the displacement of the pump as a back-up measurement. A computer is used to compare the feedback from the pump sensor with the meter reading, and if the difference between the two flow measurements is greater than a predetermined amount, an alarm will ring, the meter measurement will be ignored, the system shut down, or some other corrective action instituted by the computer. Redundancy is added to the system without the expense of obtaining an additional precision meter.

9 Claims, 1 Drawing Sheet

SAFETY BACK-UP FOR METERING PUMP CONTROL

BACKGROUND OF THE INVENTION

The invention relates generally to systems for metering pumped fluids. It pertains more particularly to systems for measuring the flow of liquid asphalt or other substances in a bituminous pavement drum mixer.

The asphalt content of a bituminous pavement material produced in a drum mixer must be held within very close tolerances. Typical specifications might call for an asphalt content of 4.95% plus or minus 0.20%. A precision meter is normally used to accurately measure the amount of liquid asphalt which is pumped from the liquid asphalt reservoir and deposited into the drum mixer. A feedback system normally uses a computer to read the amount measured by the meter and, if too high, to automatically decrease the pump delivery or, if too low, increase the pump delivery.

In the past, however, precision meters have occasionally become inaccurate or have failed altogether in operation. Some failures can result in total loss of signal, while others may result in low output or erroneous signals. Also, excessive leakage past the metering elements will cause a low output measurement. Partial plugging can cause high differential pressure which also will result in a low output reading. Total plugging, or jamming of the metering elements will cause total loss of signal. Slippage of a gear or coupling on a shaft can cause either partial or total loss of output signal.

While present control systems call for total shutdown of the process with a total loss of meter signal, partial loss of signal will not shut down the control systems and related processes and will not otherwise alert the operators that either too much or too little liquid asphalt is going into the mix. Such a deviation in mix content can cause total loss of the asphalt mix, environmental damage or damage to the drum mixer.

Prior systems already utilize relatively expensive equipment such as a precision meter and computer for reading the meter and speeding up or slowing down the pump based on the feedback from the meter. However, there was no way of introducing redundancy of the meter reading to detect inaccuracies in the meter or partial signal errors without supplying an additional precision meter, which would be another piece of expensive equipment. Even with two precision meters, both meters could fail in the same way or for the same reasons at about the same time and therefore not warn of the gradually increasing inaccuracy of the other, back-up meter.

It is an object of the present invention to provide a system for inexpensively adding redundancy to a meter in a fluid conduit having a separate pump and meter.

It is another object of the present invention to provide an inexpensive system to back-up a precision meter of a fluid control system.

It is yet another object of the present invention to provide a computer controlled system for detecting inaccuracies in a precision meter.

It is yet another object of the present invention to provide a system to assure the meeting of narrow tolerances for the delivery of liquid asphalt or other fluids to a drum mixer.

It is yet a further object of the present invention to provide an inexpensive method to add redundancy to a meter in a system using a pump to flow fluid through the meter.

It is yet an additional object of the present invention to provide a method to inexpensively check for failure or errors in a precision metering of fluids in a bituminous pavement drum mix plant.

Other and further objects, features and advantages of this invention will be apparent from the following description and illustrations of the preferred and alternative embodiments of this invention.

SUMMARY OF THE INVENTION

The present invention provides a system and a method for inexpensively adding redundancy to the metering of fluid flow through a conduit, specifically, in a bituminous pavement mix plant, inaccuracies or partial failures of a meter can be discovered by obtaining feedback of the amount of liquid asphalt being displaced by the pump and comparing that rough measurement with the more accurate measurements made by the meter of the flow of liquid.

Normally, a computer measures the output of a meter and controls the pump speed or displacement relying solely on the accuracy of the meter in determining whether to increase the liquid flow produced by the pump, to decrease it, or to keep it constant. If the meter is reading inaccurately, because of partial plugging, leakage, or any other reason, the computer will respond as if it is an accurate reading. For example, if the meter is reading less than the true amount, the computer will tell the pump to pump faster thereby sending too much liquid asphalt into the drum mixer. The present invention contemplates providing a sensor to determine the amount of liquid pumped by the liquid asphalt pump, and a computer subroutine to compare this reading to the meter reading. A discrepancy between the rough pump output measurement of the sensor and the meter output of more than a predetermined amount would cause a warning signal or, if necessary, shut down the system until the reason for the discrepancy can be determined.

The sensor gives a rough measure of the output of the pump. The amount of liquid asphalt is determined by the motor speed of the pump, i.e. the stroke or rotational frequency of the pump, and the displacement of each stroke or revolution of the pump.

In the usual arrangement, using a constant displacement pump driven by a variable speed motor, a speed sensor from the pump communicates electronically with the computer to give a rough measurement of the amount of liquid being pumped by the pump. As explained above, discrepancies between the amount of liquid asphalt being pumped and the amount being read by the meter more than a predetermined value will either cause the system to be shut down, signal the operator, or cause some other corrective measure to be taken. Alternatively, when discrepancies arise, the meter measurement can be abandoned in favor of the reading from the pump until the reason for the discrepancy can be fully determined.

In the case of a variable displacement pump provided with a constant speed motor, a position sensor detecting the amount of displacement of the pump per stroke or revolution sends this information to the computer. An actuator can change the displacement accordingly to increase or decrease the flow of liquid through the pump, or keep it the same, depending on the meter reading.

BRIEF DESCRIPTION OF THE DRAWINGS

A better understanding of the invention may be had from a consideration of the following detailed description taken in conjunction with the drawings, in which.

DETAILED DESCRIPTION OF THE INVENTION

Figure 1:
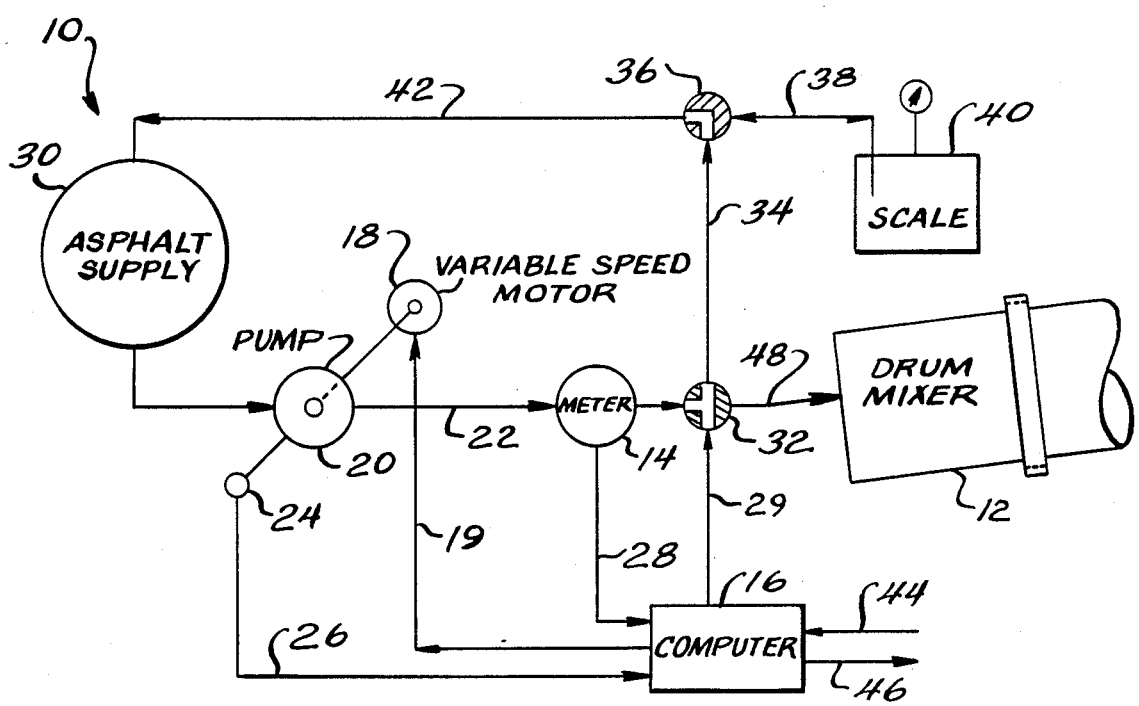
FIG. 1 is a schematic diagram showing the preferred embodiment of the present invention for use with a variable speed pump motor and constant displacement pump.

The system and method of the present invention may be understood by reference to the diagrams described above. Referring to FIG. 1, the general arrangement of component parts is depicted by 10. A drum mixer 12 in a bituminous pavement mix plant is used for heating and drying aggregate virgin material, and mixing therewith reclaimed asphaltic concrete, liquid asphalt, fine (dust) material, and additional additives in the drum mixer.

It is extremely important to the quality of the resulting mix produced by the drum mixer 12 that the amount of liquid asphalt (and other liquid additives) supplied to the mix is held within very close tolerances. For example, the typical state specifications will call for an asphalt content of approximately 4.95% plus or minus 0.20%. Although positive displacement pumps can be rough measures of liquid entering the drum mixer 12, a precision meter 14 normally is used to tell the process control computer 16 a more exact amount of asphalt that is being delivered to the drum mixer. Based on this measurement, the variable speed motor 18 is adjusted by computer 16 through output 19 so the amount of liquid asphalt pumped by the pump 20 through the conduit 22 and measured by meter 14 prior to entering the drum mixer 12, is increased, reduced or kept constant.

The pump is not normally used as the primary measuring means. Although each revolution of the pump shaft results in the transfer of a certain volume of material *almost* independent of speed and pressure, it is not totally independent of these factors. Also, because the manufacturing tolerance of pumps is great, pump 20 is not accurate enough for primary process control. However, it is accurate enough to use as a check on the meter, especially if the pump is calibrated under normal operating conditions, and those conditions remain relatively constant.

The addition of a speed sensor 24 to measure the speed of rotation of the pump 20, as driven by variable speed motor 18, and providing computer 16 with a checking sub routine, provides redundancy of the meter output. The comparator subroutine would compare the meter output with the output expected from the pump at the speed it is operating, and provide an error signal if the rates differed significantly. The controller, i.e. the computer 16, would compare the pump output signal 26 with the meter output signal 28 and compare the two. If a discrepancy arose greater than a predetermined amount, a alarm would ring or the operator would otherwise be notified. It is contemplated that other corrective measures might be programed into the computer, such as relying solely upon the pump output 26 or completely shutting down the asphalt plant immediately in order to avoid the production of costly, worthless asphalt material.

The use of a speed sensor 24 to produce a pump output signal 26 to the computer and the creation and use of a subroutine in the computer is relatively inexpensive as compared to providing a back-up precision meter similar to meter 14. In most cases, the change needed in the controlling program of the computer 16 would be fairly simple.

For purposes of completeness, FIG. 1 shows an asphalt supply 30 which communicates through conduit 22, through the pump and the meter, and ultimately through conduit 48 to the drum mixer. It is common in the industry to provide recirculation conduits 34 and 42 for the purpose of circulating asphalt to warm up all components to a uniform temperature prior to the start of asphalt mix production and also during intermittant shutdowns of the mixing operation. Valve 32 is used to divert asphalt to either the drum mixer or back to the supply tank under the control of the computer through the control/signal line 29. The meter responds to asphalt flow at all times, but the computer ignores the signal when asphalt is being recirculated, i.e. when mix is not being produced in the drum mixer. Commonly, a calibration circuit may also be provided on the plant in order to accurately calibrate the meter when it is in doubt, when a new meter is installed, or periodically as part of overall maintenance of the system.

While recirculating, valve 36 can displace the liquid asphalt or any other fluid that comes from the meter through conduits 34 and 38 onto scale 40 for a very accurate measuring of the amount of liquid going through the meter. Of course, to avoid waste after weighing, the pump can be reversed and the liquid asphalt measured on the scale 40 can be withdrawn through conduit 38, elbow 36 through conduit 34 and ultimately back to the asphalt supply 30.

It should be noted that the computer 16 is the same computer that adjusts other drum mixer process controls. Inputs and outputs are made into the computer by drum mixer process control inputs 44 and drum mixer process control outputs 46. Liquid asphalt passing through the conduit 22, through the pump 20 and meter 14, ultimately passes, when not in the recirculation phase, through conduit 48 and into drum mixer 12, where it is added to the material already in the drum mixer as is known in the art.

Figure 2:
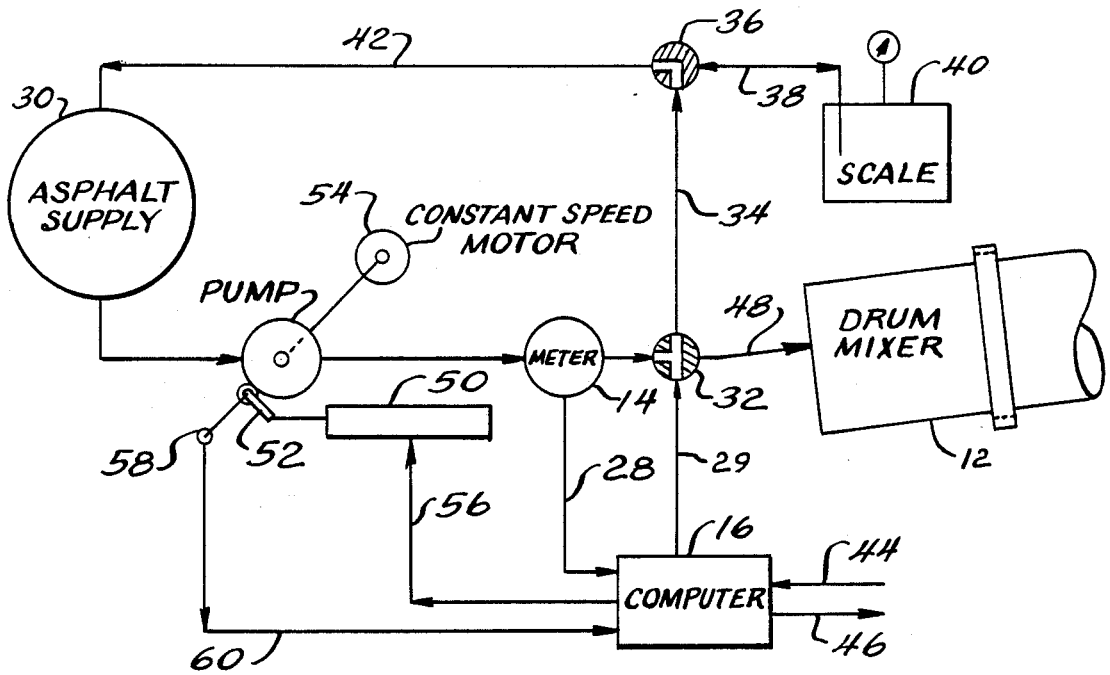
FIG. 2 is a schematic diagram showing the preferred embodiment of the present invention for use with a constant speed pump motor and variable displacement pump.

FIG. 2 shows a preferred embodiment of the present invention with variations to accomodate a constant speed motor driving a variable volume pump. In this case, meter 14 communicates through output 28 to computer 16 as was described for the system of FIG. 1. However, the computer does not control the speed of the pump motor but rather the volume of the pump per stroke or revolution. This is done through an actuator 50 which controls displacement adjusting mechanism 52 to vary the volume of fluid delivered by each stroke or revolution of the pump. The pump stroke frequency is constant by virtue of the constant speed pump motor 54. The computer controls the actuator 50, which thereafter controls the position adjuster 52, through position signal output 56. In place of speed sensor 24, a position sensor 58 is provided in the embodiment shown in FIG. 2. This position sensor 58 communicates with the computer by providing position signal input 60 which is manipulated by the computer to have a value indicative of the amount of liquid asphalt being pumped by the pump. In the event the discrepancy of the amount of liquid asphalt running through the meter and the amount determined by output 60 through position sensor 58 exceeds a predetermined amount, an alarm or other result can be provided as discussed above. The other elements shown in FIG. 2 are those similar to FIG. 1, as marked by the numerals.

The invention contemplates a method similar to that practiced in the embodiment shown in FIGS. 1 and 2. The method can comprise such steps as electronically sensing the rate of fluid pumped by the pump means, electronically communicating to a computer the sensed rate of fluid being pumped, communicating to the computer the rate of flow of the fluid measured by the meter, comparing within the computer the sensed rate of the fluid pumped with the rate measured by the meter, detecting or measuring by computer the difference between the sensed rate of fluid pumped and the rate measured by the meter and determining whether it exceeds a predetermined amount and, if so, electronically signaling or taking other action, as previously discussed.

The actual details of building a pavement mix plant incorporating the present invention, such as what particular pumps, meters or materials to use, is well known within the art.

The invention contemplates applications beyond merely to a bituminous pavement asphalt plant. It is contemplated that this system can be used in any fluid moving system utilizing a precision meter of pumped fluid wherein the delivery of an accurate amount of fluid is desired and the failure of the meter to accurately read could have potentially damaging results. However, additional advantages are obtained by application of this invention as described above.

It is thus clearly seen that the present invention provides a significant advantage for inexpensively providing redundancy to a precision meter. Accuracy can now be assured without incurring the added expense of providing an additional precision meter into a drum mix plant.

It is to be understood that the invention is not limited to the specific features shown, but that the means, method and construction herein disclosed comprise only the preferred form of several modes of putting the invention into effect. The invention is, therefore, claimed in any of its forms or modifications within the legitimate and valid scope of the appended claims.

What is claimed is:

1. A system for detecting undesirably large variance in a precision meter used to measure the flow of fluid from a pump, the system comprising:
   a fluid supply vessel for containing a fluid;
   a deposit area to receive fluid from the supply vessel through a conduit;
   a pump associated with the conduit to pump fluid from the supply vessel and through the conduit to the deposit area;
   a precision meter associated with the conduit to measure the flow of fluid through the conduit;
   pump sensing means communicating with the pump for sensing the volume of fluid pumped by the pump; and
   computer means communicating with the pump sensing means and with the meter, the computer means capable of comparing information regarding the volume of pumped fluid measured and the flow of fluid through the meter;
   wherein the computer means will detect and signal if variance between the pumped volume of fluid and the flow of fluid measured by the meter exceeds a predetermined amount.

2. The system of claim 1 wherein the pump is driven by a variable speed motor and has constant displacement, and is controlled by a computer.

3. The system of claim 2 wherein the computer means is a computer programmed to accomplish the function of comparing information regarding the volume of pumped fluid and the flow of fluid detected by the meter and detecting and signaling if the variants between the pumped volume of fluid and the flow of fluid measured by the meter exceeds a predetermined amount.

4. The system of claim 1 wherein the pump has variable displacement and constant motor speed, and wherein the pump sensing means is a position sensor which can determine the periodic displacement of the pump.

5. The system of claim 4 further comprising an actuator to change the relative displacement of the pump.

6. The system of claim 5 wherein the computer means receives signals from the precision meter and the pump position sensor and has output controlling the position through the actuator to control the position of the displacement setting.

7. A method for inexpensively adding redundancy to a meter measuring the rate of flow of a fluid pumped by pump means through a conduit, the method comprising steps of:
   automatically sensing the rate of fluid that is pumped by the pump means;
   automatically communicating to a computer the sensed rate of fluid being pumped;
   automatically communicating to the computer the rate of flow of the fluid measured by the meter;
   comparing within the computer the sensed rate of fluid pumped with the rate measured by the meter;
   detecting by computer if the difference between the sensed rate of pumped fluid and the rate measured by the meter exceeds a predetermined amount; and
   automatically signaling if the predetermined amount of rate difference is exceeded;
   whereby significant inaccuracies in the meter are signaled.

8. An improved method of measuring the rate of flow of liquid asphalt from a supply vessel, through a conduit into a drum mixer, the liquid asphalt being pumped by a computer controlled pump, and a meter communicating to the computer the measured rate of flow of liquid asphalt from the pump through the conduit, the improvement comprising:
   sensing by the computer of the rate of liquid asphalt being pump by the pump; and, emitting a signal by the computer to an alarm if the difference between the rate pumped by the pump and the rate of flow communicated by the meter exceeds a predetermined amount.

9. The improved method of claim 7 further comprising the step of automatically turning off the pump if the difference between the rate of liquid being pumped by the pump and the rate of flow communicated by the meter exceeds a predetermined amount.

* * * * *